(No Model.)
J. A. JEFFREY.
DRIVE CHAIN.
No. 336,921. Patented Mar. 2, 1886.
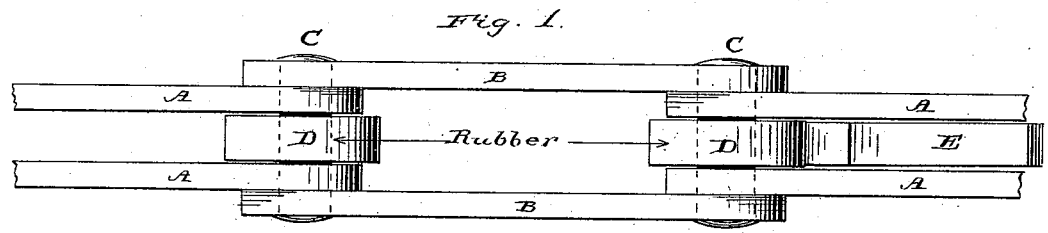
Fig. 1.
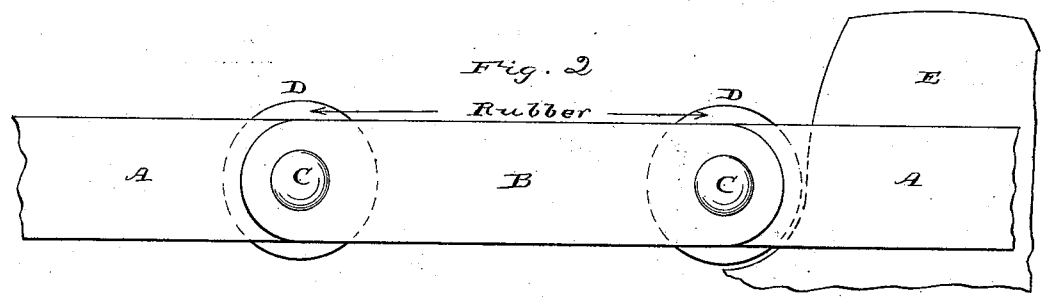
Fig. 2.
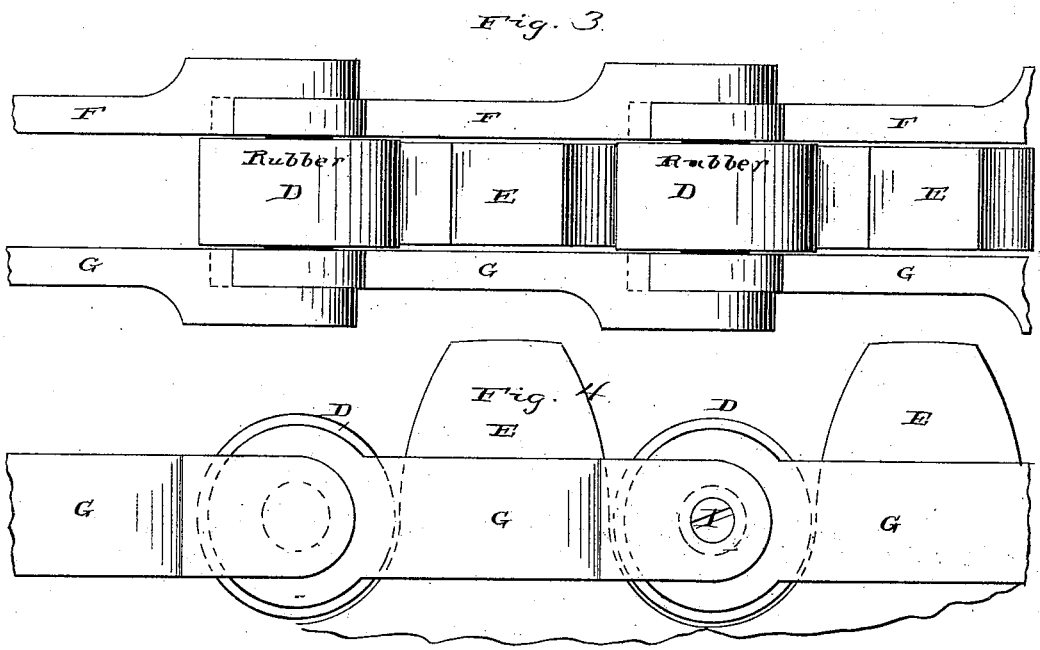
Fig. 3.
Fig. 4.
Witnesses:
H. N. Low
J. S. Barker
Inventor:
Joseph A. Jeffrey
by Mckeeley & Blin
Attys.

UNITED STATES PATENT OFFICE.

JOSEPH A. JEFFREY, OF COLUMBUS, OHIO.

DRIVE-CHAIN.

SPECIFICATION forming part of Letters Patent No. 336,921, dated March 2, 1886.

Application filed August 18, 1882. Serial No. 69,708. (No model.)

*To all whom it may concern:*

Be it known that I, JOSEPH A. JEFFREY, a citizen of the United States, residing at Columbus, in the county of Franklin and State of Ohio, have invented certain new and useful Improvements in Drive-Chains, of which the following is a specification, reference being had therein to the accompanying drawings.

Figure 1 is a plan view showing a section of a chain and sprocket-wheel having my invention applied thereto. Fig. 2 is a side view of Fig. 1. Fig. 3 is a plan view of a section of a sprocket-wheel and a different kind of chain having also my invention embodied therein, and Fig. 4 is a side view of Fig. 3.

It is well known that in the use of chains and sprocket-wheels for the transmission of power and similar purposes there is more or less noise, and also a jarring or concussion produced by the engagement of the chains with the spurs of the wheels.

The object of my invention is to overcome both of these objections; and it consists in combining with the chain rollers made of rubber or similar elastic or semi-elastic material, said rollers to be mounted upon the end bars of the chain-links.

In the drawings, A A B B C represent, respectively, the rectangular metal bars and pivots of a chain substantially like that patented to F. M. Lechner, January 7, 1879.

D is an anti-friction roller mounted on the pivot C, there being by preference one roller on each pivot in the chain. These rollers are made of vulcanized rubber of such degree of hardness as the kind of work and other conditions shall render desirable.

F G I represent, respectively, the side bars and a screw passing through one of the side bars and into an end bar of a chain constructed in substantial accordance with patent to F. M. Lechner, July 25, 1882, and having similar anti-friction rollers D.

E E represent spurs of sprocket-wheels, with which the rubber rollers engage when the parts are in motion.

From an examination of the drawings it will be readily understood that by reason of the engagement of these rubber rollers with the corresponding parts of the sprocket-wheels the noise, the jarring, and the wearing away of the working-faces of the sprocket-wheel teeth will be much less than is produced by the operation of wheels and the chains provided with metallic anti-friction rollers, which have been heretofore used.

I am aware that for many years it has been common to apply leather, rubber, &c., to the teeth of intermeshing cog-wheels, and also to construct the rims and teeth of said wheels of rubber, and also to apply rubber bands to the grooves in the peripheries of wheels, and I do not mean to be understood as including such wheels within the scope of my invention; but in a chain of the classes generally represented herein the rubber rollers are materially different from the wheels heretofore known, both in their relations to the other parts of the mechanism and in their construction.

It would in practice be impossible to construct of rubber the small sprocket-teeth mostly employed with chain-and-sprocket mechanism; nor am I aware that an attempt even has ever been made to use such teeth, to say nothing of not being aware of a successful use. When cogged teeth have been heretofore made of rubber, they have been formed integrally with the rim, either throughout the whole periphery or throughout a long series or section, and when one is worn or destroyed the whole rim or the whole series or section integral with the worn or damaged one becomes worthless. Therefore wheels of this character are expensive, and it has been impracticable to provide the cheap chain-and-sprocket-wheel mechanism now so commonly in use with rubber or elastic noiseless bearings of the kinds heretofore known; but the difficulties incident to rubber rims with integral teeth are overcome by combining with the chain a separate small roller at each bearing-point, entirely or partly made of rubber, which rollers retain the advantages incident to the older steel rollers—namely, their being anti-frictional and readily removable to allow the substitution of others in case of wear or damage—and at the same time they avoid the above-mentioned defects of the steel rollers— namely, the jarring and clattering noise well known to be incident to their use.

With a chain of the character of that in Figs. 3 and 4—especially, that is, one whose links are each detachable from the others—it is the work of but a moment to remove a worn or damaged rubber roller and substitute another, and even where the older form of chain is used—that is, one having riveted or permanently-fastened pivots—it is much cheaper and easier to remove the pivot of worn or damaged roller than to remove the rim of a toothed wheel or a section thereof after a tooth has become impaired, for, as noticed above, if the teeth of a wheel be made of rubber all or several must be formed integrally with a rubber rim, and all that are thus integral are virtually impaired. Nor do I claim as my invention a rubber roller, broadly.

What I claim is—

In a drive-chain connected at its joints or articulations by pivots, the links and pivots, in combination with rubber rolls around the pivotal joints, which serve as cushions and are adapted to engage with the projections on the sprocket-wheels, substantially as set forth.

In testimony whereof I affix my signature in presence of two witnesses.

JOSEPH A. JEFFREY.

Witnesses:
JOHN M. TIBBETTS,
H. L. HEATON.